(12) United States Patent
Takeuchi et al.

(10) Patent No.: US 10,922,499 B2
(45) Date of Patent: Feb. 16, 2021

(54) CARD READER

(71) Applicant: NIDEC SANKYO CORPORATION, Nagano (JP)

(72) Inventors: Junro Takeuchi, Nagano (JP); Masaya Fujimoto, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 198 days.

(21) Appl. No.: 16/142,686

(22) Filed: Sep. 26, 2018

(65) Prior Publication Data
US 2019/0095659 A1 Mar. 28, 2019

(30) Foreign Application Priority Data

Sep. 26, 2017 (JP) .................................. 2017-184385

(51) Int. Cl.
*G06K 7/00* (2006.01)
(52) U.S. Cl.
CPC .................... *G06K 7/0021* (2013.01)
(58) Field of Classification Search
CPC .................................................... G06K 7/0021
See application file for complete search history.

(56) References Cited

U.S. PATENT DOCUMENTS

2009/0094700 A1* 4/2009 Goto ....................... G06F 21/86
726/26
2014/0325150 A1* 10/2014 Hashimoto ............. H01L 23/66
711/115

FOREIGN PATENT DOCUMENTS

JP 2012204527 A 10/2012

* cited by examiner

*Primary Examiner* — Sonji N Johnson
(74) *Attorney, Agent, or Firm* — Cantor Colburn LLP

(57) ABSTRACT

A card reader may include a break-in sensing circuit and a security circuit structured to output a break-in sensing signal into the break-in sensing circuit, and receive a returned break-in sensing signal that returns from the break-in sensing circuit. The security circuit may include an output terminal to output the break-in sensing signal, and an input terminal to receive the returned break-in sensing signal. The break-in sensing signal may be input to an input section of the break-in sensing circuit, and then output from an output section of the break-in sensing circuit as the returned break-in sensing signal. The break-in sensing signal may be a pulse signal. At least either one of the output terminal and the input terminal of the security circuit may include a protection element between the terminal itself and an earth ground.

16 Claims, 5 Drawing Sheets

CARD READER

CROSS REFERENCE TO RELATED APPLICATIONS

The present application claims priority under 35 U.S.C. § 119 to Japanese Application No. 2017-184385 filed Sep. 26, 2017, the entire content of which is incorporated herein by reference.

FIELD

At least an embodiment of the present invention relates to a card reader for reading out a datum recorded in a card.

BACKGROUND

Conventionally, known is a flexible print circuit board to be used in a card reader (for example, refer to Patent Document 1). A flexible print circuit board described in Patent Document 1 has a multiple-layer structure including a datum signal layer, a disconnection sensing signal layer, and an insulation layer; and from a top surface to a bottom surface in the flexible print circuit board, there are laminated an insulation layer, a disconnection sensing signal layer, another insulation layer, a datum signal layer, another insulation layer, another disconnection sensing signal layer, and another insulation layer in this order. In the datum signal layer, there is formed a datum signal circuit (a datum signal pattern) for transferring a datum read out of a card, and a datum to be recorded in a card. In the disconnection sensing signal layer, there is formed a disconnection sensing signal circuit (a disconnection sensing signal pattern) for sensing that the disconnection sensing signal circuit itself is broken.

PATENT DOCUMENT

Patent Document 1: Japanese Unexamined Patent Application Publication No. 2012-204527

SUMMARY

In card reader types; requirements for a card reader, which is specialized for a security performance, are enhanced. In such a type of a card reader, as a general rule, there is employed a CPU, which is provided with a special function for datum encryption and a special function for sensing a physical aggression from external, (a so-called security CPU). For sensing a physical aggression from external, it is needed to protect a device by use of a security line, and unfortunately such a security line becomes long so as to be likely badly affected by noise; and therefore a technology for dealing with wrong detection is sought.

At least an embodiment of the present invention provides a technology with which an effect of noise from external can be reduced and wrong detection can be avoided, in a card reader that employs a security CPU and includes a function for watching out for an external aggression and the like, by means of a break-in sensing circuit (a security mesh circuit).

Means to Solve the Problem

A card reader according to at least an embodiment of the present invention includes; a break-in sensing circuit (a security mesh circuit) for sensing at least one of states of the break-in sensing circuit itself being broken, the break-in sensing circuit itself being short-circuited, a case having been removed, and the card reader having been removed; and a security circuit that outputs a break-in sensing signal into the break-in sensing circuit, and obtains a break-in sensing signal that has come back; wherein, the security circuit has an output terminal to output the break-in sensing signal, and an input terminal to obtain the break-in sensing signal that has come back; the break-in sensing signal is input to an input section of the break-in sensing circuit from the output terminal of the security circuit, and then output from an output section of the break-in sensing circuit, and input to the input terminal of the security circuit so as to come back to the security circuit; the break-in sensing signal is a pulse signal; and at least either one of the output terminal and the input terminal of the security circuit has a protection element between the terminal itself and an earth ground.

According to this configuration; (1) although the input terminal and the output terminal of the security circuit, being connected to the break-in sensing circuit, are sometimes influenced by noise coming externally so as to cause wrong detection, such noise influence can be prevented by the protection element so that the wrong detection can be avoided. Furthermore, (2) since the break-in sensing signal is a pulse signal, a state of the break-in sensing circuit can accurately be detected, by means of observing a phase difference between the input terminal and the output terminal in the security circuit, being compared to a case in which the break-in sensing signal is observed in accordance with a fixed logic.

The protection element may be one of a zener diode, a capacitor, a parallel circuit of a capacitor and a zener diode, and a parallel circuit of a zener diode and a low-pass filter. A voltage of the input terminal (and the output terminal) is confined to a zener voltage because of using the zener diode, in such a way that wrong detection owing to noise can be reduced. Furthermore, an anti-noise performance can be improved by way of connecting the capacitor and the low-pass filter (a resistance, or a capacitor) in parallel, so that wrong detection can be reduced.

The protection element may be placed for each of the input terminal and the output terminal.

The input terminal and the output terminal can be protected in a direct way, regardless of a load of the break-in sensing circuit. Particularly, in the case of the break-in sensing circuit by use of pattern wiring, a resistance becomes great because of elongated wiring. Then, noise can be reduced for sure by way of providing both the input terminal and the output terminal with a protection element.

The break-in sensing circuit may be one of a circuit by pattern wiring, a circuit by a switch, and a hybrid circuit including pattern wiring and a switch.

While various sensing becomes enabled by way of enabling the break-in sensing circuit to be made up with a configuration of a multiple types of circuits, wrong detection owing to noise can be reduced by use of a protection element, regardless of any configuration of the break-in sensing circuit.

With the output terminal and the input terminal of each one in the security circuit being defined as one port in combination, two ports may be assigned for a connection to the break-in sensing circuit, in the case where the break-in sensing circuit is the pattern wiring.

With two ports being assigned, sensing can be done with respect to not only disconnection but also short-circuiting. In other words, a break-in by use of a drill, a screwdriver and the like can be detected.

With the output terminal and the input terminal of each one in the security circuit being defined as one port in combination, one port may be assigned for a connection to the break-in sensing circuit, in the case where the break-in sensing circuit is an element for sensing that the card reader has been removed from a higher-level device where the card reader is installed.

With one port being assigned solely, error sensing can exclusively be done with respect to a device where the card reader is installed (a device of a customer side); and therefore an error can be notified to the device where the card reader is installed, being separated from any other error (in other words, being definitely discriminated from any other error).

With the output terminal and the input terminal of each one in the security circuit being defined as one port in combination, a plurality of break-in sensing circuits may be connected in series between the output terminal and the input terminal in the one port.

Even in the case of a limited number of ports at a side of the security circuit, the security circuit can deal with operation by way of connecting the break-in sensing circuits in series. Moreover, since the security circuit is free from an increase in the number of ports, a low power consumption can be materialized.

Two or more detection switches may be included as elements of the break-in sensing circuit, in the case where the plurality of break-in sensing circuits are connected in series.

Being in comparison to pattern wiring, the detection switches have less resistance; and therefore, phase lag is unlikely to happen so that sensing of multiple times can be done, without a decrease in sensing accuracy.

The detection switches may be placed for open sensing with respect to the same one component.

For example, this configuration is effective for open sensing with respect to a case body, to be carried out at a side section as well as a rear section. Namely, in the case of error sensing, under conditions where a plurality of break-in sensing circuits are connected in series with respect to the same one component, open sensing with respect to the case body can instantly be done according to an error of an objective port. In other words, it can be determined that the same one component has an error.

In the case of an element of the break-in sensing circuit including pattern wiring, a capacitance of a capacitor connected to the output terminal and the input terminal may be specified in accordance with a resistance value of the pattern wiring.

Phase lag with respect to the break-in sensing signal can be specified according to a load of each break-in sensing circuit, by way of individually adjusting the capacitance of the capacitor, so that wrong detection at each position can be reduced.

The security circuit operates by use of a power source supplied, and the security circuit may be able to operate by use of a battery in the case of no power source being supplied.

By way of battery operation, error sensing can be done during transportation; and operation by use of the battery or the power source can be done, while the number of ports is saved by means of connecting a plurality of break-in sensing circuits in series.

According to at least an embodiment of the present invention, a technology in order to control an effect of noise by use of a protection element, and avoid wrong detection, can be materialized in a card reader that employs a security CPU and includes a function for watching out for an external aggression and the like, by means of a break-in sensing circuit.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1A:
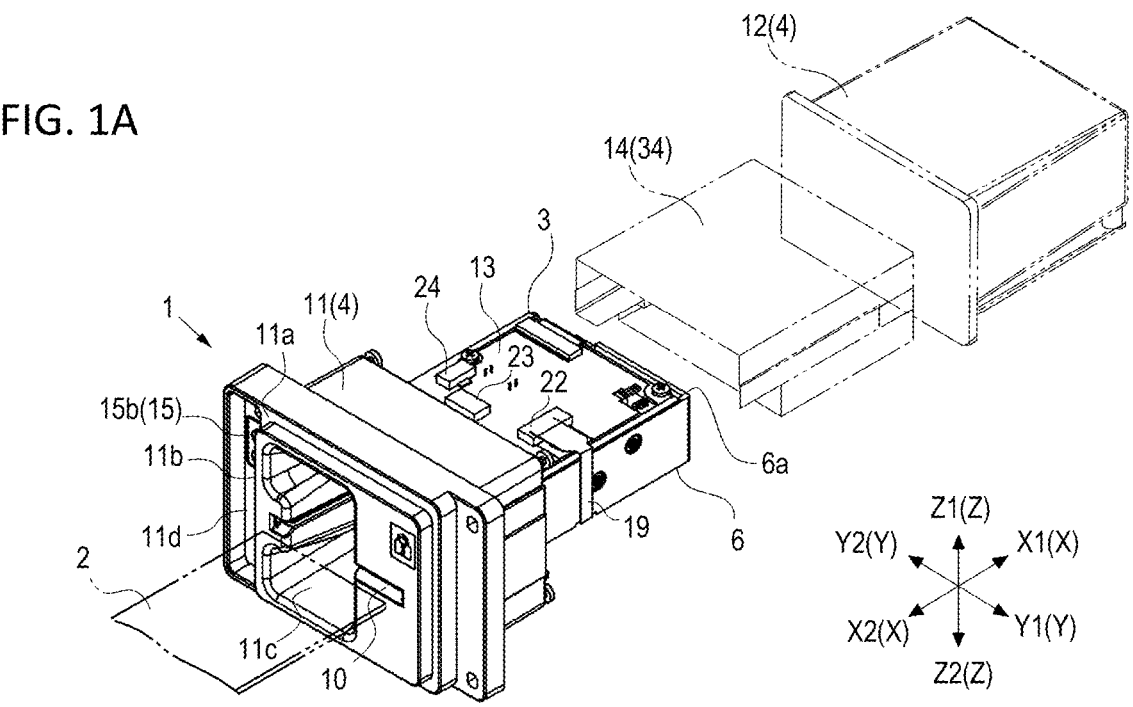
FIG. 1A, FIG. 1B, and FIG. 1C include perspective views of a card reader relating to an embodiment.
Figure 1B:
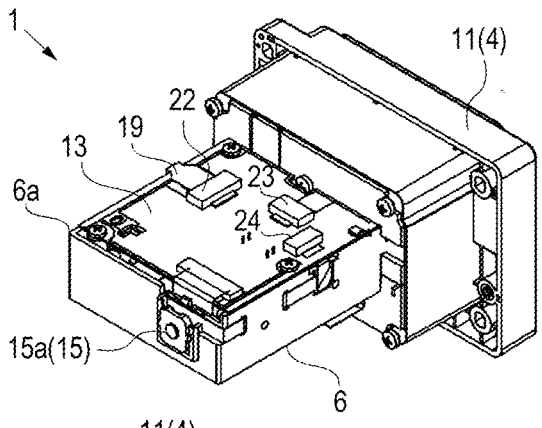
Figure 1C:
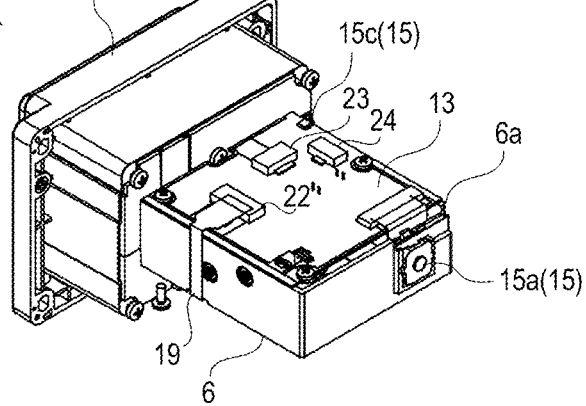

At least an embodiment (hereinafter simply called an "embodiment") is explained below with reference to the drawings. FIG. 1A, FIG. 1B and FIG. 1C include perspective views of a card reader 1 relating to the present embodiment. Being a front-side perspective view, FIG. 1A shows a main case body 12 and a protection circuit board 14 being separated from each other. FIG. 1B and FIG. 1C are a rear-side perspective view and another rear-side perspective view in another angular direction, respectively; wherein the main case body 12 and the protection circuit board 14 are omitted in these views. Then, FIG. 2 is a diagram showing a general outline of a function to be served by a security CPU 50 installed in the card reader 1 (particularly, with regard to a security watching function).

Figure 2:
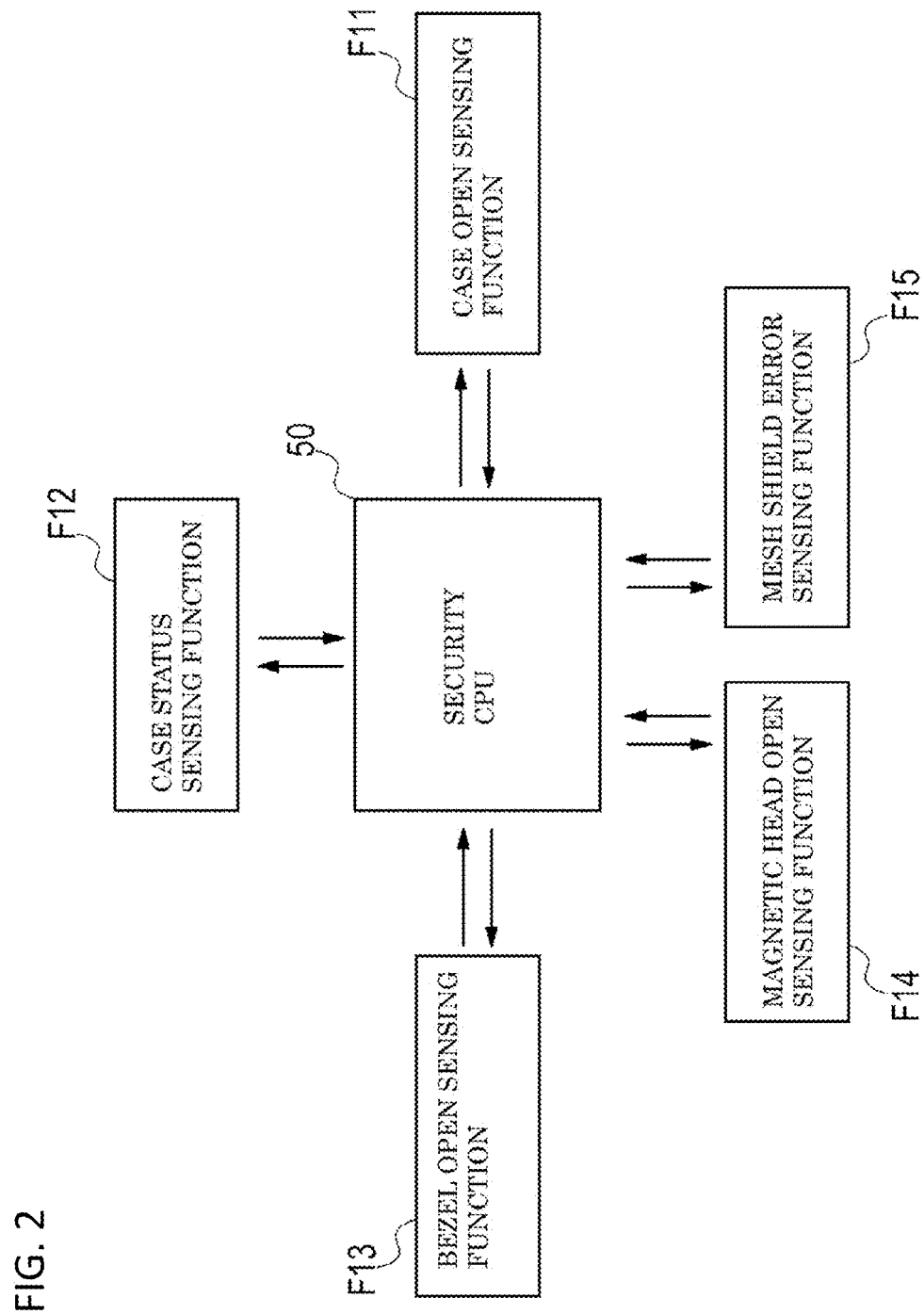
FIG. 2 is a diagram showing a function to be served by a security CPU installed in the card reader relating to the embodiment.

As shown in FIG. 2, the security watching function to be served by the security CPU 50 includes: a case open sensing function (a case open detection) F11, a case status sensing function (a case analyze detection) F12, a bezel open sensing function (a bezel open detection) F13, a magnetic head open sensing function (a magnetic head open detection) F14, and a mesh shield error sensing function (a mesh shield detection) F15. The security CPU 50 serves the functions described above, by way of watching a break-in sensing circuit (a security mesh circuit) 33. As an element of the break-in sensing circuit 33, for example, there are a conductive pattern 35 so formed as to be mesh-like, a flexible circuit board 19 having a pattern in the same way, and a switch 15 (including a switch 15a, a switch 15b and a switch 15c). The security CPU 50 makes a watching judgment by way of outputting a break-in sensing signal as a pulse signal to the break-in sensing circuit 33, so as to observe a signal that comes back.

As shown in FIG. 1A to FIG. 1C, the card reader 1 reads out a datum recorded in a card 2. Concretely to describe, the card reader 1 is a so-called card reader of a dip type; and inserting the card 2 and pulling out the card 2 is manually carried out in order to read out a datum. The card reader 1 is installed, for example, for use in a fueling system of an unmanned or self-service gas station, or a higher-level device of an automatic teller machine (ATM) and the like.

For example, the card 2 is a rectangular card made of polyvinyl chloride, having a thickness of about 0.7 to 0.8 mm. On one side of the card 2, there is formed a magnetic stripe where a magnetic datum is recorded. Moreover, an IC chip is embedded in the card 2; and on the other side of the card 2, there is formed an external connection terminal of the IC chip. Incidentally, the card 2 may be a polyethylene terephthalate (PET) card having a thickness of about 0.18 to 0.36 mm, or a paper card having a predetermined thickness, and the like.

The card reader 1 includes a card reader main body 3 and a case body 4 for covering the card reader main body 3. The card reader main body 3 includes; a main body frame 6 where a card transfer path (in other words, a path stretching backward from an insertion slot 10) for transfer of the card 2 is prepared, a magnetic head (not illustrated) for reading out a magnetic datum recorded in the card 2, and an IC contact block (not illustrated) that has a plurality of IC contact springs for datum communication with an IC chip embedded in the card 2.

The case body 4 is configured with a front cover 11 in which the insertion slot 10 for the card 2 is formed, and the main case body 12. The card reader 1 further includes: a control circuit board 13 that is a print circuit board for control, the protection circuit board 14 (a break-in sensing pattern 34) that is a print circuit board for protecting the control circuit board 13, and a sheet switch 15 (membrane switch) (including switch parts 15a, 15b, and 15c), which senses that the front cover 11 has been removed, and the card reader 1 has been removed from a higher-level device.

The card 2, which is handled manually, moves in an X-direction illustrated. In other words, the X-direction (including an X1-direction and an X2-direction) is a traveling direction of the card 2 moving through the card transfer path. Additionally to describe, the card 2 is inserted in the X1-direction and pulled out in the X2-direction. Moreover, a Z-direction (including a Z1-direction and a Z2-direction) being perpendicular to the X-direction is a thickness direction of the card 2 moving through the card transfer path. Then, an illustrated Y-direction (including a Y1-direction and a Y2-direction) being perpendicular to the X-direction as well as the Z-direction is a width direction (widthwise direction) of the card 2 moving through the card transfer path.

In the explanation below, the X-direction is represented as a front-back direction, the Y-direction is a right-and-left direction, and then the Z-direction is represented as a vertical direction. Additionally to describe, a side of the X1-direction, in which the card 2 is inserted into the card reader 1, is represented as a "back" side, and a side of the X2-direction, in which the card 2 is pulled out from the card reader 1, is represented as a "front" side. Then, a side of the Y1-direction as one of both sides in the right-and-left direction is dealt with as a "right" side, and a side of the Y2-direction as the other side in the right-and-left direction is dealt with as a "left" side; and in the meantime, a side of the Z1-direction as one of both sides in the vertical direction is dealt with as an "upper" side, and a side of the Z2-direction as the other side in the vertical direction is dealt with as a "lower" side.

The main body frame 6 includes a card holding part 6a in which a rear end part of the card 2 inserted into the card reader 1 (in other words, the card 2 inserted through the insertion slot 10) is held, a head location part where the magnetic head is placed (an internal part inside the front cover 11 in the drawing), and a card guide part for guiding the card 2 inserted through the insertion slot 10.

The front cover 11 is placed at a front side of the main body frame 6 in such a way as to cover a front side part of the main body frame 6. Then, the front cover 11 makes up a front section of the card reader 1. At a front side of the front cover 11, there is formed a mounting surface 11a for installing the card reader 1 to the higher-level device. The mounting surface 11a is prepared as a plane perpendicular to the front-back direction. Moreover, at the front side of the front cover 11, there is formed an exposed part 11b that is located in an opening part formed in a front panel of the higher-level device. The exposed part 11b is so formed as to protrude frontward from the mounting surface 11a, in such a way as to make up a part of the front panel of the higher-level device at a time when the card reader 1 is installed to the higher-level device.

Furthermore, in the front cover 11, there is formed a finger insertion part 11c that is recessed backward from a front section of the exposed part 11b. The finger insertion part 11c is so shaped as to have a size that enables a user's finger to be inserted there; and at a time when a user inserts and pulls out the card 2, the user's finger is inserted into the finger insertion part 11c. The insertion slot 10 is formed, extending in the front section of the exposed part 11b, both sides of the right and left sections as well as a rear section of the finger insertion part 11c. Furthermore, at the front side of the front cover 11, there is formed a concave part 11d that is recessed backward from the mounting surface 11a. The concave part 11d is formed at a left-hand side of the exposed part 11b.

The main case body 12 is so shaped as a box being almost rectangular, which opens at its front end. The front cover 11 and the main case body 12 are fixed to each other in a state where a rear end of the front cover 11 and a front end of the main case body 12 contact with each other. The case body 4 covers both of upper and lower sides, both of right-hand and left-hand sides, and both of front and back sides of the card reader main body 3.

The control circuit board 13 is a rigid circuit board so formed as to be almost rectangular and plate-like. The control circuit board 13 is fixed to a top surface of the card holding part 6a. The magnetic head is electrically connected to the control circuit board 13 by the intermediary of the flexible circuit board 19. Moreover, the IC contact block is also electrically connected to the control circuit board 13 by the intermediary of the flexible circuit board. Furthermore, on the control circuit board 13, there is mounted the security CPU 50 that is described in detail in FIG. 2, FIG. 4, and FIG. 5; and then the security CPU 50 watches out for a destructive act and a wrong conduct toward the card reader 1.

Furthermore, on the control circuit board 13, there are mounted a connector 22 to which the flexible circuit board 19 is connected, a connector 23 to which the protection circuit board 14 is connected, and a connector 24 to which the sheet switch 15 is connected.

The control circuit board 13 is provided with a datum signal circuit layer in which a datum signal circuit is formed for conveying a signal of a magnetic datum (a datum signal) that is read out of the magnetic stripe of the card 2 by use of the magnetic head. Moreover, the control circuit board 13 is provided with a datum signal circuit layer in which a datum signal circuit is formed for conveying a signal of a magnetic datum (a datum signal) that is read out of the IC chip of the card 2 by use of the IC contact springs.

As shown in FIG. 1B and FIG. 1C; switches are provided as the sheet switch 15 that is one circuit as the break-in sensing circuit 33: the switches including; the switch part 15a provided at a rear side (a side of the X1-direction), the switch part 15a being placed at the side of the X1-direction in order to sense that the card reader 1 has been removed from the main case body 12; the switch part 15c located at a side of the Y2-direction; and the switch part 15b provided at a front side (a side of the X2-direction) in order to sense that the card reader 1 has been removed from the higher-level device; each of the switches being provided as a detection switch of a contact type, having a contact electrode and the like.

The switch parts 15a, 15b, and 15c are in a conduction state when the card reader 1 is fixed to the higher-level device and the like; and turns into a non-conduction state if once the card reader 1 is removed, in such a way that the security CPU 50 senses that the card reader 1 has been removed.

The protection circuit board 14 is configured with a flexible print circuit board. Being one circuit as the break-in sensing circuit 33, the protection circuit board 14 includes a break-in sensing circuit layer (the conductive pattern 35) for sensing that the break-in sensing circuit 33 itself is broken and the break-in sensing circuit 33 is short-circuited, and insulation layers placed so as to sandwich the break-in sensing circuit 33. The break-in sensing circuit 33 is connected to the security CPU 50 so as to sense disconnection and short-circuiting described above.

Figure 3A:
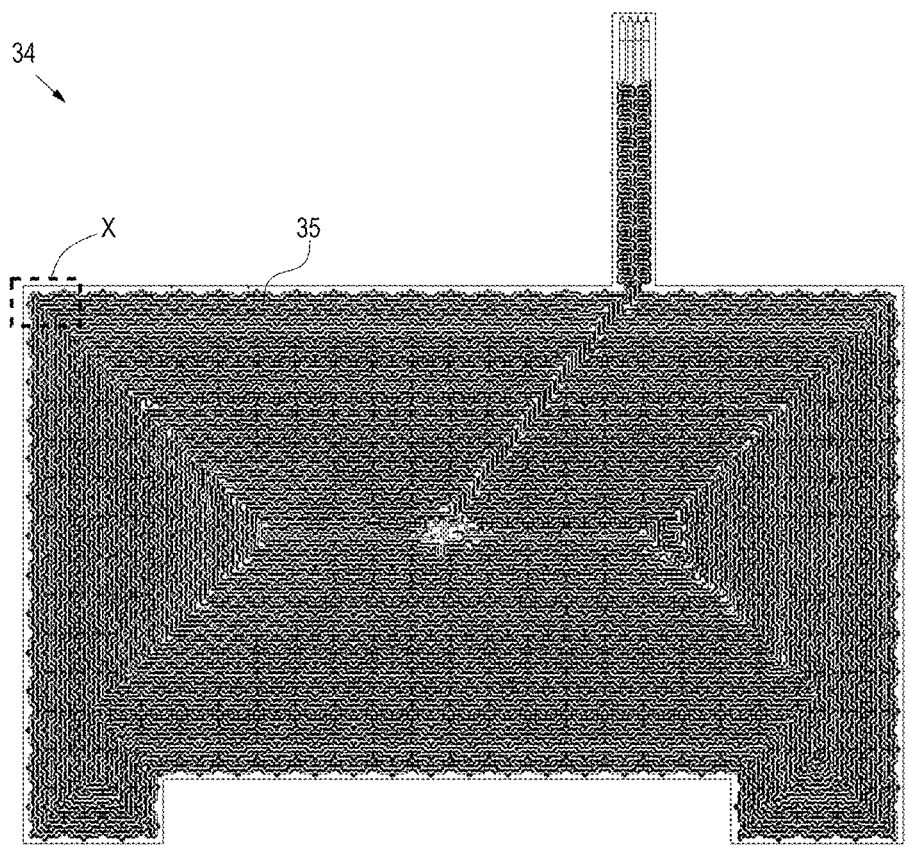
FIG. 3A and FIG. 3B include diagrams showing a break-in sensing pattern, being one circuit as a break-in sensing circuit, relating to the embodiment.
Figure 3B:
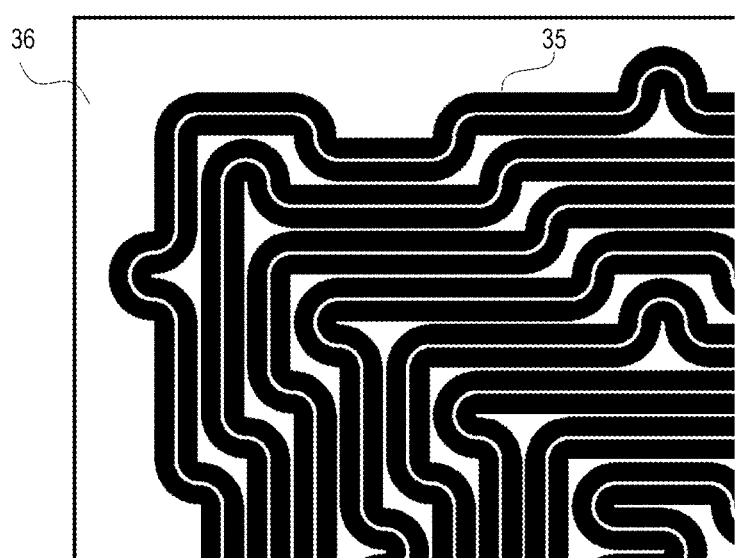

FIG. 3A and FIG. 3B include diagrams showing the break-in sensing pattern 34, being one circuit as the break-in sensing circuit 33. FIG. 3A shows an overall view (developed figure), and meanwhile FIG. 3B enlarges and illustrates an area 'X' in FIG. 3A The conductive pattern 35 is formed in an almost whole area of the protection circuit board 14. The protection circuit board 14 is so placed as to surround the card holding part 6a and the control circuit board 13 at both of upper and lower sides, both of right and left sides and a rear side.

The conductive pattern 35 is configured by way of densely combining a linear pattern and an arc-like pattern. Since the conductive pattern 35 is configured in this way, physically and externally approaching for the purpose of destruction immediately causes short-circuiting or disconnection so that the security CPU 50 senses wrongdoing. With respect to the flexible circuit board 19 as well, a wiring pattern and an interval in the wiring pattern are prepared in such a way that physically and externally approaching is likely to cause short-circuiting or disconnection.

According to the present embodiment; if a criminal carries out any wrong conduct for the purpose of wrongly obtaining a datum so that the security CPU 50 senses the wrong conduct toward the higher-level device, or senses that the card reader 1 has fraudulently been removed, by way of short-circuiting or disconnection of the conductive pattern 35 of the break-in sensing circuit 33, or switching operation of the sheet switch 15; the security CPU 50 carries out a predetermined process, such as deleting a datum stored in the control circuit board 13, putting the control circuit board 13 into an inoperable state, or notifying the higher-level device of the unusual condition.

As described above, having a lot of traps, the card reader 1 needs to carry out monitoring by use of a plurality of security terminals, for the purpose of sensing an external aggression. The number of terminals is dependent on specifications of the security CPU 50. There exist cases to be taken into consideration, such as a case of the card reader 1 being removed from the higher-level device, another case of the card reader 1 being disassembled, still another case of the card reader 1 being broken down by use of a drill and the like, as well as a case of the main case body 12 being removed. Unfortunately, owing to a different sensing mechanism and a different circuit, characteristics on wrong detection are different from one another; and therefore it is necessary to consider a specific anti-noise performance for each type of the card reader 1. With respect to the functions shown in FIG. 2, each part between the security CPU 50 and a configuration for materializing each function (namely, a part indicated with arrows in the drawing) represents a security line that requires an anti-noise performance.

Figure 4:
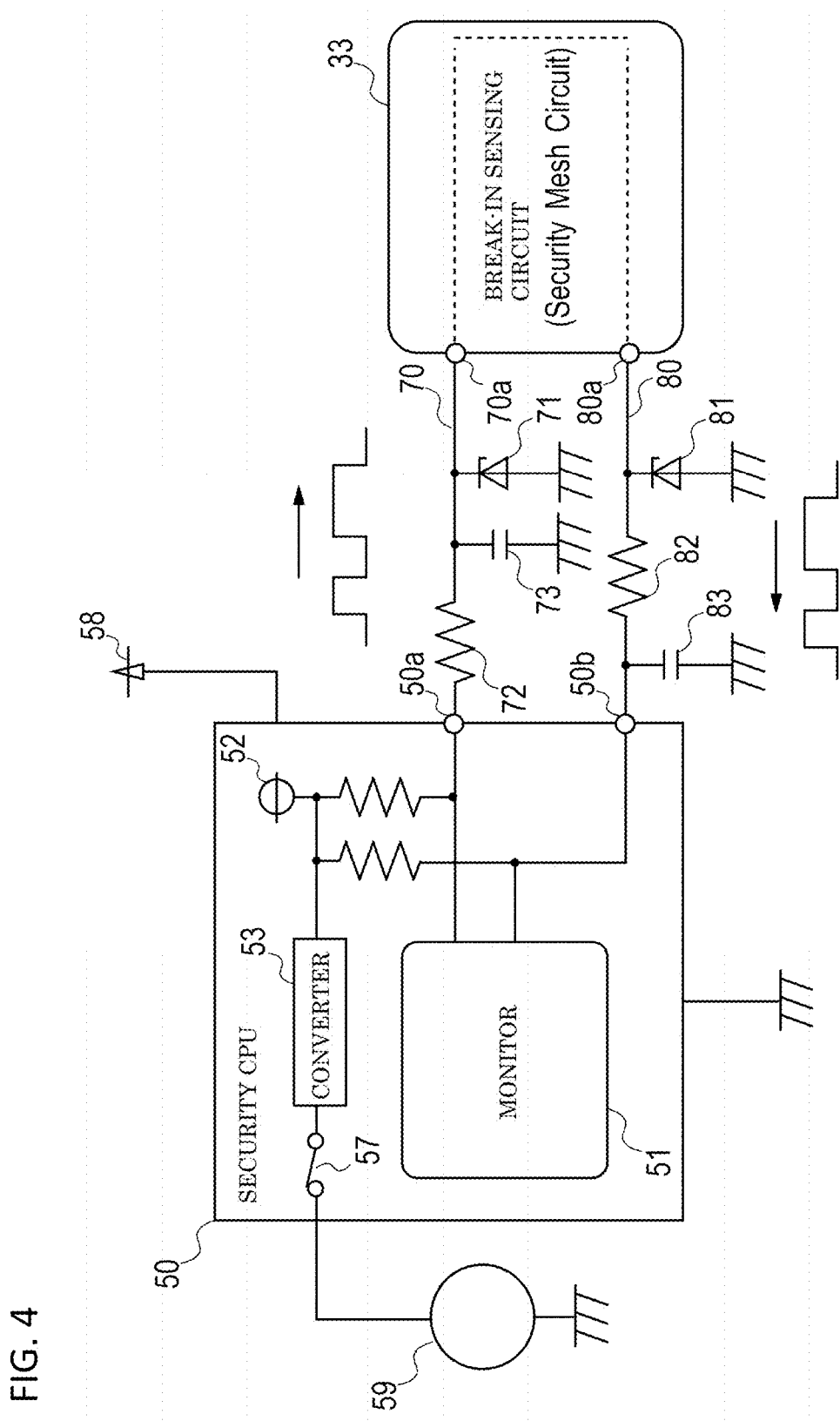
FIG. 4 is a diagram showing a configuration example of connection between the security CPU and the break-in sensing circuit, relating to the embodiment.

FIG. 4 is a diagram showing a configuration example of connection between the security CPU 50 and the break-in sensing circuit 33. Being connected to a predetermined power source (a Vcc power source voltage 58, in this case) and an earth ground, the security CPU 50 is supplied with electric power. Moreover, even in a state of being not connected to a power supply source, for example, at a time of transportation of the card reader 1, the security CPU 50 is connected to a battery 59, as a DC power supply source, in such a way that a predetermined function is executed. In the case where no power source voltage is connected to the security CPU 50, error sensing can be carried out during transportation, by way of battery operation; and in the case where the Vcc power source voltage 58 is connected, connection to the battery 59 is intercepted by a switch 57 so that operation can be carried out by use of the Vcc power source voltage 58. The security CPU 50 includes a converter 53 for converting a voltage from the battery 59 as required, and I/O ports (a CPU output terminal 50a and a CPU input terminal 50b) for connection to the break-in sensing circuit 33. The converter 53 is connected to a Vdd reference voltage 52.

The number of I/O ports is dependent on specifications of the security CPU 50. In the case described here, only one port (in other words, a couple of the CPU output terminal 50a and the CPU input terminal 50b) is shown as an example.

An input line 70 leading out of the CPU output terminal 50a is connected to an input section 70a of the break-in sensing circuit 33. In the break-in sensing circuit 33, the input section 70a is connected to an output section 80a by way of an internal path. A break-in sensing signal that has been output from the CPU output terminal 50a of the security CPU 50 is input through the input section 70a into the break-in sensing circuit 33, and then output to an output line 80 from an output section 80a by way of a configuration element of the break-in sensing circuit 33, so as to come back to the CPU input terminal 50b of the security CPU 50.

As described above; while a pulse signal as a break-in sensing signal being output from the CPU output terminal 50a of the security CPU 50, a monitor section 51 of the security CPU 50 watches out and observes the pulse signal that comes back to the CPU input terminal 50b by way of the break-in sensing circuit 33. Since the break-in sensing signal is a pulse signal, a state of the break-in sensing circuit 33 can accurately be detected by means of observing a phase difference between an input terminal (the CPU input terminal 50b) and an output terminal (the CPU output terminal 50a) in a security circuit (the security CPU 50), being compared to a case in which the break-in sensing signal is so fixed as to be a High or Low signal.

For all routes (security lines) leading to a security block (namely, the break-in sensing circuit 33), which is connected to the control circuit board 13 where the security CPU 50 is installed, an anti-noise measure is taken by use of a capacitor 73 and a capacitor 83 explained later.

As the break-in sensing circuit 33; there is applied a circuit of the conductive pattern 35 or a wiring pattern such as the flexible circuit board 19, or otherwise a circuit by use of the sheet switch 15, as described above. The break-in sensing circuit 33 may be configured as a single circuit of any one of the circuits described above, or may be configured as a hybrid circuit including some of those circuits.

The break-in sensing circuit 33 can arbitrarily be configured in accordance with the number of I/O ports. Then, while various sensing becomes enabled by way of making up the break-in sensing circuit 33 with a configuration of a multiple types of circuits, wrong detection owing to noise can be reduced by use of a protection element, regardless of any configuration of the break-in sensing circuit 33.

In the case of the break-in sensing circuit 33 being configured with a plurality of elements, there may be provided a circuit in which the elements are connected in series. Such a configuration is effective in the case where only a small number of I/O ports exist or a curb on power consumption is expected.

Furthermore, in the case of a plurality of elements connected in series; if the sheet switch 15 (including the switch part 15a, the switch part 15b, and the switch part 15c) is adopted as those elements, the sheet switch 15 has less resistance, being in comparison to a wiring pattern such as the break-in sensing pattern 34 (i.e., the conductive pattern 35), in such a way that phase lag is unlikely to happen. Therefore, sensing with respect to a plurality of elements can be done, without a decrease in sensing accuracy.

Moreover, connecting a plurality of elements in series is effective in the case of open sensing with respect to the same one component; more concretely to describe, in the case where open sensing with respect to the case body 4, being the same one component, is carried out at a plurality of locations (for example, with the switch part 15c at a side section and the switch part 15a at a rear section). In the case of error sensing with respect to the same one component, it can instantly be determined according to an error of an objective port that the same one component has an error.

Moreover, if two ports are used for a circuit by pattern wiring such as the break-in sensing pattern 34 (the conductive pattern 35), sensing can be done with respect to not only disconnection but also short-circuiting. In other words, a break-in by use of a drill, a screwdriver and the like can be detected for sure.

Furthermore, one port may be assigned solely to the break-in sensing circuit 33 (the switch part 15b, in this case) for sensing that the card reader 1 is removed from the higher-level device where the card reader 1 is installed. In this case, error sensing can exclusively be done with respect to the higher-level device where the card reader 1 is installed (for example, a device of a customer side); and therefore an error can be notified to the higher-level device, being definitely discriminated from any other error, such as the open sensing for the case body 4, as described above.

In this embodiment, a protection element configured with any one of a zener diode 71, a resistance 72, and a capacitor 73, or a combination including some of them is provided in the input line 70. In the same way, a protection element configured with any one of a zener diode 81, a resistance 82, and a capacitor 83, or a combination including some of them is provided in the input line 80. Incidentally, in the drawing illustrated, there is shown a configuration including all of the zener diodes 71 & 81, the resistances 72 & 82, and the capacitors 73 & 83 as protection elements.

Concretely to describe, the input line 70 is grounded by the intermediary of the zener diode 71. At the time, an anode side of the zener diode 71 is positioned at a ground side, and a cathode side of the zener diode 71 is positioned at a side of the input line 70. In the same way, the output line 80 is grounded by the intermediary of the zener diode 81. An anode side of the zener diode 81 is positioned at a ground side, and a cathode side of the zener diode 81 is positioned at a side of the output line 80. The zener diodes 71 & 81 have a function to lock a breakdown voltage even at a time of being influenced by a great noise. Therefore, voltages of the CPU output terminal 50a and the CPU output terminal 50b are confined to a zener voltage; and as a result, wrong detection owing to noise can be reduced.

The capacitor 73 is placed, being in parallel with the zener diode 71, between the input line 70 and the ground. In this present case, the zener diode 71 is located at a position closer to the break-in sensing circuit 33 (the input section 70a) than the capacitor 73. In the same way, the capacitor 83 is placed, being in parallel with the zener diode 81, between the output line 80 and the ground. Then, the zener diode 81 is located at a position closer to the break-in sensing circuit 33 (the output section 80a) than the capacitor 83. Nevertheless, an order of connection with regard to the zener diode and the capacitor may be reversed. In such a case, a layout position of the resistance complies with a connection order in a format of combination with the capacitor.

As described above; each security line leading to the security block (namely, the break-in sensing circuit 33) is so long that impedance of the security line tends to become great. Then, it becomes possible to remove an oscillation motivator and mixed noise into the ground, by way of providing the capacitors 73 & 83.

The resistance 72 of the input line 70 is provided between a connection point of the capacitor 73 to the input line 70 and the CPU output terminal 50a. Being provided according to placement in this manner, the resistance 72 and the capacitor 73 can play a role as a low-pass filter so-called. In the same way, the resistance 82 of the output line 80 is provided between connection points of the zener diode 81 and the capacitor 83 to the output line 80. Being provided according to placement in this manner, the resistance 82 and the capacitor 83 can play a role as a low-pass filter so-called.

Though there are placed the zener diode 71, the resistance 72 and the capacitor 73 in the input line 70, and meanwhile the zener diode 81, the resistance 82 and the capacitor 83 in the output line 80; all being as protection elements, in the configuration described above; a concept of the present invention is not limited to an arrangement explained above. In other words, the configuration of the protection elements can be modified in accordance with a function required.

For example, if most attention is paid to containment of wrong detection owing to noise, by way of confining the voltages of the CPU output terminal 50a and the CPU output terminal 50b to the zener voltage, the resistances 72 & 82 and the capacitors 73 & 83 may be omitted so as to place only the zener diodes 71 & 81. Meanwhile, if most attention is paid to removing an oscillation motivator and mixed noise into the ground, the zener diodes 71 & 81 and the resistances 72 & 82 may be omitted so as to place only place the capacitors 73 & 83. Moreover, if most attention is paid to a function as the low-pass filter, the zener diodes 71 & 81 may be omitted so as to place only the resistances 72 & 82 and the capacitors 73 & 83. If no function as the low-pass filter is needed, the resistances 72 & 82 may be omitted so as to place only the zener diodes 71 & 81 and the capacitors 73 & 83.

Furthermore, a measure for the purpose of removing an acute noise may be taken by way of making a time constant of the resistances 72 & 82 increased so as to blunt a pulse signal. Moreover, providing a general purpose diode in place of the zener diodes 71 & 81 can still result in a certain effect.

Moreover, in the case where noise is expected to be small, or any other anti-noise measure is implemented, only either of the input line 70 and the output line 80 is possibly sufficient. Therefore, in such a case, a protection device needs to be placed in an only path of either the input line 70 or the output line 80.

Incidentally, if a protection device is placed in both the input line 70 and the output line 80, the CPU output terminal 50a and the CPU input terminal 50b can individually be protected in a direct way, regardless of a load of the break-in sensing circuit 33. Namely, in the case of the break-in sensing circuit 33 such as the break-in sensing pattern 34, a resistance tends to become great because of elongated wiring. Then, noise can be reduced for sure by way of providing both the CPU output terminal 50a and the CPU input terminal 50b with a protection element.

A sensing time period in the case of receiving an external attack is specified in the security standards (PCI and PTS). Therefore, it is needed to avoid having a time constant that is unnecessary. In the case of having the break-in sensing circuit 33 with great impedance (the conductive pattern 35, a wiring pattern of the flexible circuit board 19, and the like), such as a case of the embodiment described above, anti-noise measure extremely becomes important. Then, sometimes a noise removal at a location being distant from the security CPU 50 is ideal; and a noise removal at a location being close to the security CPU 50 is also ideal sometimes.

Figure 5:
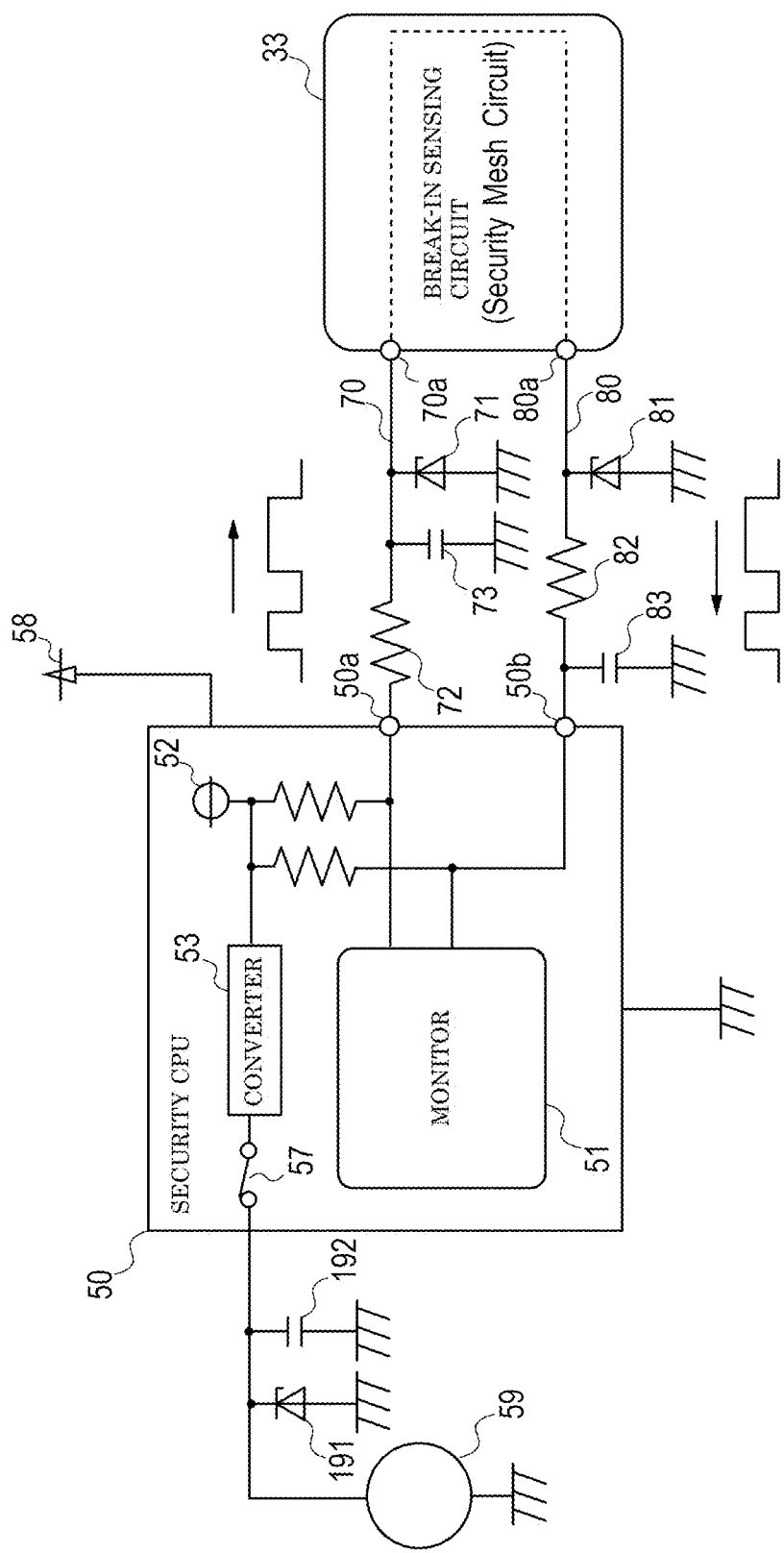
FIG. 5 is a diagram showing a configuration example of connection between the security CPU and the break-in sensing circuit, relating to a modification of the embodiment.

FIG. 5 is a diagram showing a configuration example of connection between the security CPU 50 and the break-in sensing circuit 33, relating to a modification. A difference from the configuration shown in FIG. 4 is a point that a line for connection to the battery 59 is also provided with a protection element in order to take an anti-noise measure.

As described above, the monitor section 51 of the security CPU 50 carries out monitoring operation by use of the battery 59, even in a state where a main power source of the card reader 1 as a product is not supplied with power. Therefore, with respect to a route of connection from the security CPU 50 to the battery 59 as well, a zener diode 191 and a capacitor 192 are placed between the route and the ground, for implementation of an anti-noise measure.

At least an embodiment of the present invention is explained above according to the embodiment, and the embodiment only illustrates an example. As will be understood by a person skilled in the art, various modifications can be made with respect to a combination of the configuration elements, and the like, and such various modifications are also included in a scope of the present invention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader comprising:
   a break-in sensing circuit structured to sense at least one of:
   a state of the break-in sensing circuit being broken,
   a state of the break-in sensing circuit being short-circuited,
   a state of a case having been removed, and
   a state of the card reader having been removed; and
   a security circuit structured to output a break-in sensing signal into the break-in sensing circuit, and receive a returned break-in sensing signal that returns from the break-in sensing circuit;
   wherein the security circuit comprises an output terminal to output the break-in sensing signal, and an input terminal to receive the returned break-in sensing signal;
   the break-in sensing signal is input to an input section of the break-in sensing circuit from the output terminal of the security circuit, and then output from an output section of the break-in sensing circuit as the returned break-in sensing signal, and input to the input terminal of the security circuit;
   the break-in sensing signal is a pulse signal; and
   at least either one of the output terminal and the input terminal of the security circuit comprises a protection element between the terminal itself and an earth ground,
   wherein the break-in sensing circuit is one of a circuit by pattern wiring, a circuit by a switch, and a hybrid circuit including pattern wiring and a switch, and
   wherein, with the output terminal and the input terminal of each one in the security circuit being defined as one port in combination, one port is assigned for a connection to the break-in sensing circuit, in the case where the break-in sensing circuit is an element for sensing that the card reader has been removed from a higher-level device where the card reader is installed.

2. The card reader according to claim 1;
   wherein the protection element is one of a zener diode, a capacitor, a parallel circuit of a capacitor and a zener diode, and a parallel circuit of a zener diode and a low-pass filter.

3. The card reader according to claim 2;
   wherein the protection element is placed for each of the input terminal and the output terminal.

4. The card reader according to claim 3;
   wherein, with the output terminal and the input terminal of each one in the security circuit being defined as one port in combination, two ports are assigned for a connection to the break-in sensing circuit, in the case where the break-in sensing circuit is the pattern wiring.

5. The card reader according to claim 1;
   wherein the protection element is placed for each of the input terminal and the output terminal.

6. The card reader according to claim 1;
   wherein, with the output terminal and the input terminal of each one in the security circuit being defined as one port in combination, two ports are assigned for a connection to the break-in sensing circuit, in the case where the break-in sensing circuit is the pattern wiring.

7. The card reader according to claim 1;
   wherein, with the output terminal and the input terminal of each one in the security circuit being defined as one port in combination, a plurality of break-in sensing circuits are connected in series between the output terminal and the input terminal in the one port.

8. The card reader according to claim 7;
   wherein, in the case where the plurality of break-in sensing circuits are connected in series, the break-in sensing circuit comprises two or more detection switches.

9. The card reader according to claim 8;
wherein, the detection switches are placed for open sensing with respect to the same one component.

10. The card reader according to claim 9;
wherein, in the case of an element of the break-in sensing circuit including pattern wiring, a capacitance of a capacitor connected to the output terminal and the input terminal is specified in accordance with a resistance value of the pattern wiring.

11. The card reader according to claim 10;
wherein, the security circuit operates by use of a power source supplied, and the security circuit can operate by use of a battery in the case of no power source being supplied.

12. A card reader comprising:
a break-in sensing circuit structured to sense at least one of:
   a state of the break-in sensing circuit being broken,
   a state of the break-in sensing circuit being short-circuited,
   a state of a case having been removed, and
   a state of the card reader having been removed; and
a security circuit structured to output a break-in sensing signal into the break-in sensing circuit, and receive a returned break-in sensing signal that returns from the break-in sensing circuit;
wherein the security circuit comprises an output terminal to output the break-in sensing signal, and an input terminal to receive the returned break-in sensing signal;
the break-in sensing signal is input to an input section of the break-in sensing circuit from the output terminal of the security circuit, and then output from an output section of the break-in sensing circuit as the returned break-in sensing signal, and input to the input terminal of the security circuit;
the break-in sensing signal is a pulse signal; and
at least either one of the output terminal and the input terminal of the security circuit comprises a protection element between the terminal itself and an earth ground,
wherein, with the output terminal and the input terminal of each one in the security circuit being defined as one port in combination, a plurality of break-in sensing circuits are connected in series between the output terminal and the input terminal in the one port.

13. The card reader according to claim 12;
wherein in the case where the plurality of break-in sensing circuits are connected in series, the break-in sensing circuit comprises two or more detection switches.

14. The card reader according to claim 13,
wherein the detection switches are placed for open sensing with respect to the same one component.

15. A card reader comprising:
a break-in sensing circuit structured to sense at least one of:
   a state of the break-in sensing circuit being broken,
   a state of the break-in sensing circuit being short-circuited,
   a state of a case having removed, and
   a state of the card reader having been removed; and
a security circuit structured to output a break-in sensing signal into the break-in sensing circuit, and receive a returned break-in sensing signal that returns from the break-in sensing circuit;
wherein the security circuit comprises an output terminal to output the break-in sensing signal, and an input terminal to receive the returned break-in sensing signal;
the break-in sending signal is input to an input section of the break-in sensing circuit from the output terminal of the security circuit, and then output from an output section of the break-in sensing circuit as the returned break-in sensing signal, and input to the input terminal of the security circuit;
the break-in sensing signal is a pulse signal; and
at least either one of the output terminal and the input terminal of the security circuit comprises a protection element between the terminal itself and an earth ground,
wherein, in the case of an element of the break-in sensing circuit including pattern wiring, a capacitance of a capacitor connected to the output terminal and the input terminal is specified in accordance with a resistance value of the pattern wiring.

16. The card reader according to claim 1;
wherein the security circuit operates by use of a power source supplied, and the security circuit can operate by use of a battery, in the case of no power source being supplied.

* * * * *